(12) United States Patent
VanSlyke et al.

(10) Patent No.: US 10,814,442 B2
(45) Date of Patent: Oct. 27, 2020

(54) NUT TORQUING DEVICE FOR RECESSED NUT

(71) Applicant: General Electric Company, Schenectady, NY (US)

(72) Inventors: Donald Alden VanSlyke, Glenville, NY (US); Murat Alver, Istanbul (TR); Erkin Bayindir, Istanbul (TR); Philip Frank Burnett, Niskayuna, NY (US); Curtis Maurice Hebert, Schenectady, NY (US); Mesut Merev, Izmit-Kocaeli (TR); August Elwood Pendergast, Greenfield, NY (US); Paul August Quail, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 891 days.

(21) Appl. No.: 15/283,493

(22) Filed: Oct. 3, 2016

(65) Prior Publication Data

US 2018/0093356 A1 Apr. 5, 2018

(51) Int. Cl.
*B23P 19/06* (2006.01)
*B25B 21/00* (2006.01)
*B25B 13/48* (2006.01)

(52) U.S. Cl.
CPC ............ *B23P 19/06* (2013.01); *B25B 13/481* (2013.01); *B25B 21/002* (2013.01); *B25B 21/004* (2013.01)

(58) Field of Classification Search
CPC ..... B23P 19/06; B25B 13/481; B25B 21/002; B25B 21/004; B25B 21/00; B25B 13/48; B25B 13/505

(Continued)

(56) References Cited

U.S. PATENT DOCUMENTS 4,620,460 A 11/1986 Gonzales, Jr.
4,882,958 A 11/1989 McNeeley
(Continued)

FOREIGN PATENT DOCUMENTS

CN 102513956 A 6/2012
DE 40 04 849 C1 4/1991

OTHER PUBLICATIONS

Extended European Search Report and Opinion issued in connection with corresponding EP Application No. 17192884.9 dated Mar. 2, 2018.

*Primary Examiner* — Monica S Carter
*Assistant Examiner* — Abbie E Quann
(74) *Attorney, Agent, or Firm* — James Pemrick; Hoffman Warnick LLC

(57) ABSTRACT

A nut torqueing device for a recessed nut is disclosed. The nut torqueing device includes a nut engaging assembly to engage a nut in a recess. The nut engaging assembly includes: a nut engaging element to engage the nut in the recess, at least one stackable riser element to stackably connect to one of the nut engaging element and an adjacent stackable riser element therebelow, and a transmission engaging element to stackably connect to an uppermost one of the at least one stackable riser element. A ratchet interface within the nut engaging assembly allows rotation of the nut engaging element in only one direction, while other stackable elements rotationally interlock. A low profile transmission extends within a small space to transmit rotational power to the nut engaging assembly. The nut torqueing device is applicable with a terminal nut of an electric generator.

10 Claims, 21 Drawing Sheets

(58) Field of Classification Search
USPC .................................................. 81/64, 65.2
See application file for complete search history.

(56) References Cited

U.S. PATENT DOCUMENTS

| | | | | |
|---|---|---|---|---|
| 5,983,757 A | * | 11/1999 | Blise | B23K 1/0008 81/57.39 |
| 7,066,691 B2 | * | 6/2006 | Doyle | B25B 23/141 192/55.1 |
| 9,108,747 B2 | | 8/2015 | Roberts et al. | |
| 9,205,542 B2 | | 12/2015 | Dedrickson et al. | |

* cited by examiner

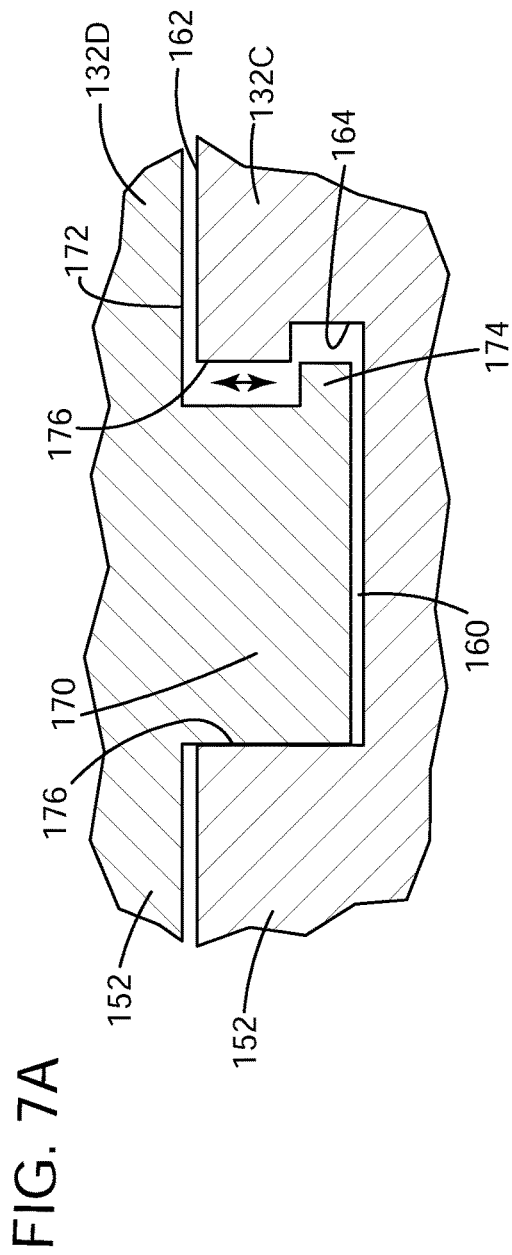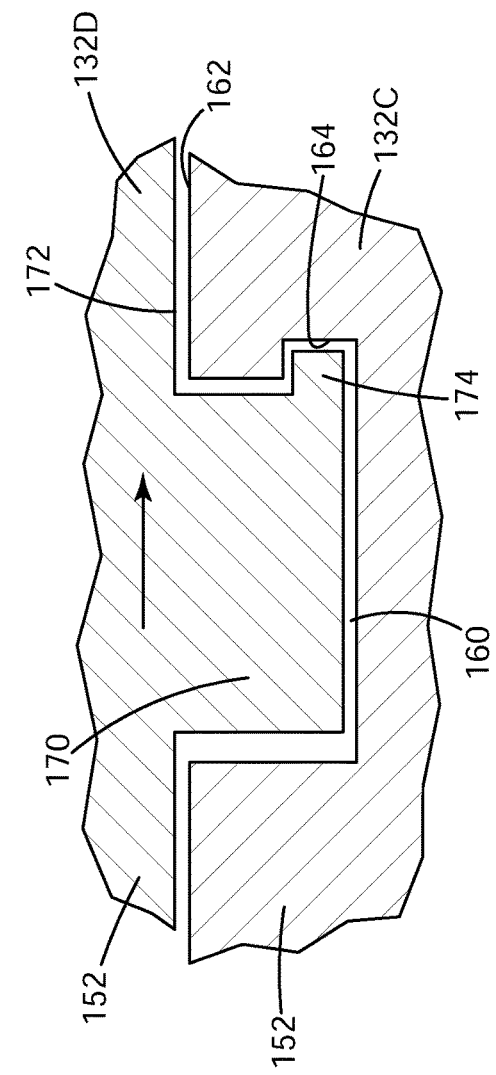

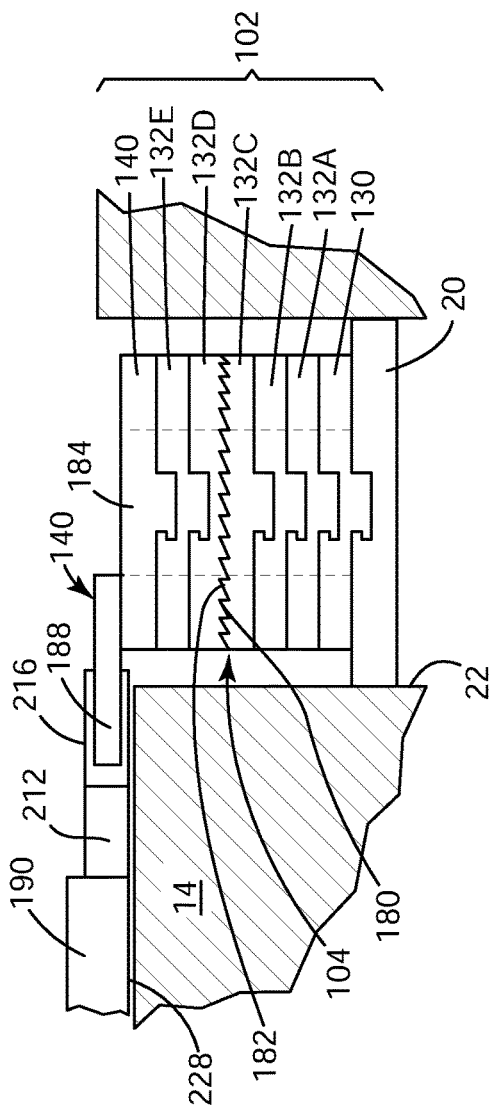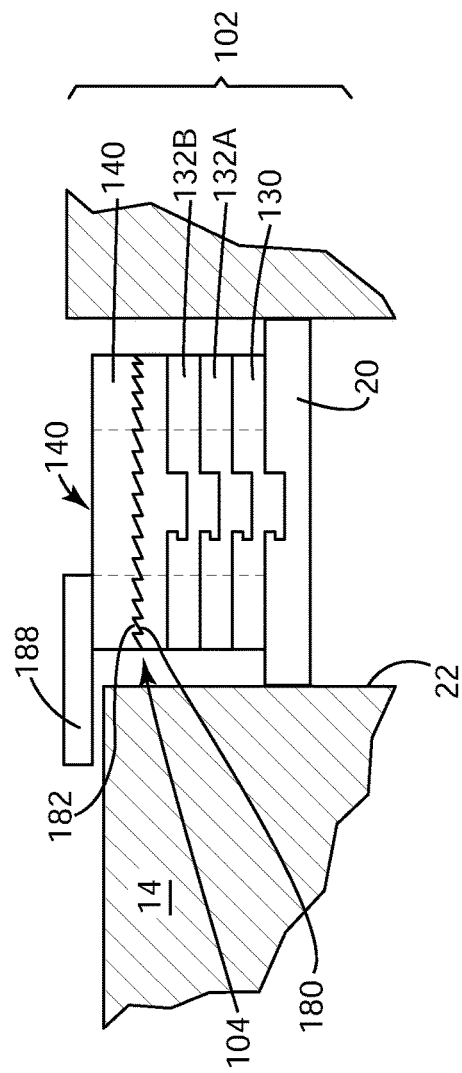

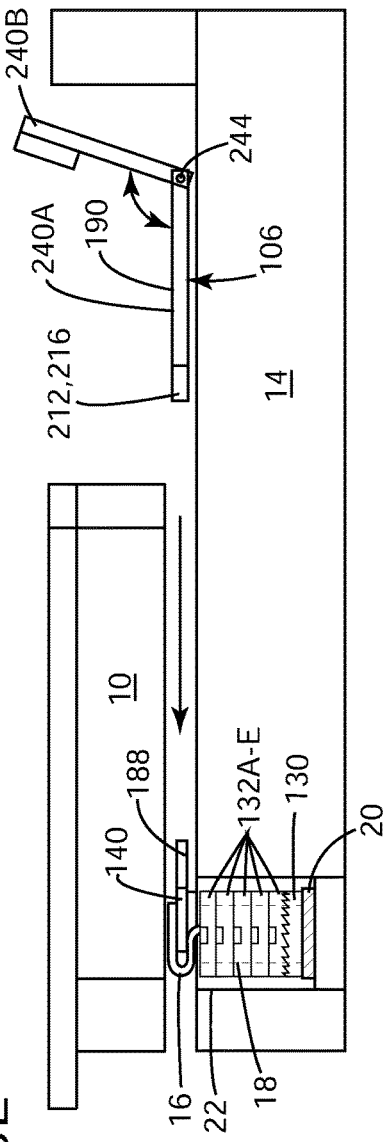
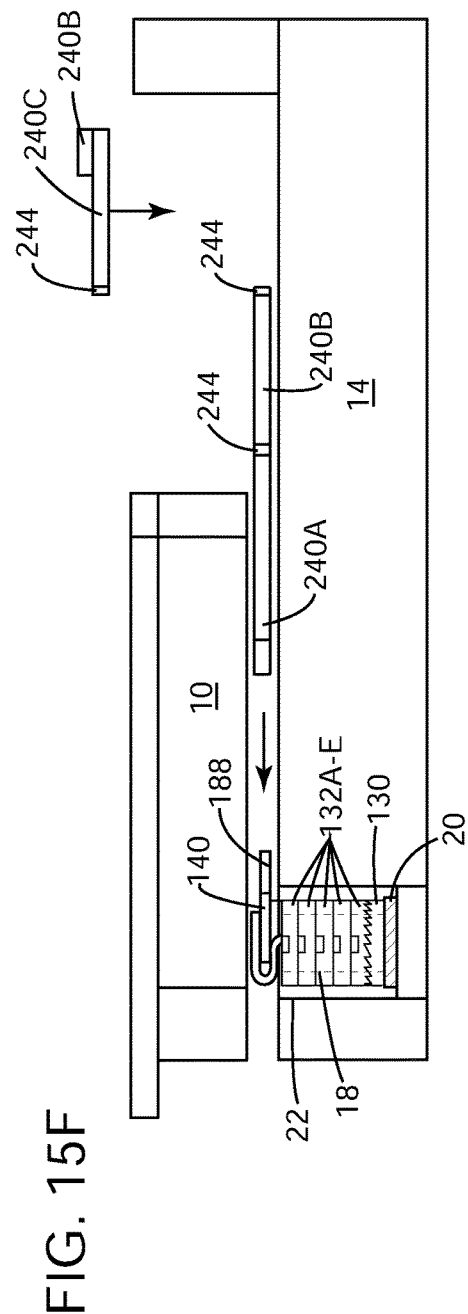

NUT TORQUING DEVICE FOR RECESSED NUT

BACKGROUND OF THE INVENTION

The disclosure relates generally to tools, and more particularly, to a nut torqueing device for recessed nut in an industrial machine such as a terminal nut in an electric generator.

On industrial machines, large fasteners such as nuts are used to fasten parts of the machines together. One challenge presented in some settings is accessing fasteners during repairs and/or manufacture of the industrial machines. For example, one form of industrial machine that includes a number of difficult to access fasteners is an electric generator. FIG. 1 shows a perspective view of one example of an electric generator 8. Generator 8 includes end windings 10 of a stator 12 that extend about a rotor 14. As shown in the cross-section of FIG. 2, end windings 10 are connected on an inner surface 30 thereof to leads 16 using an elongated terminal 18 which extends radially from a centerline of rotor 14. Terminal 18 is secured within rotor 14 with a nut 20, referred to as a 'terminal nut', which threads into a recess 22 in rotor 14. End windings 10 are also positioned within one or more retaining rings 24 that hold end windings 10 in place. Occasionally, it is beneficial to tighten terminal nut 20.

As shown in FIG. 2, terminal nut 20 is positioned in a very difficult location to reach using conventional tools, e.g., wrenches, socket sets, etc. More particularly, terminal nut 20 is positioned: a) within recess 22 within rotor 14 at a distance D1, e.g., about 7-13 centimeters (cm), from an outer surface 26 of rotor 14, and b) axially under end windings 12 and retainer ring(s) 24 a distance D2, e.g., about 33-43 cm, from an axial end 27 of retainer ring(s) 24, which is also, c) axially distanced from a rotor flange 28 a distance D3, e.g., about 17-27 cm. Further, a distance D4 between outer surface 26 of rotor 14 and an inner surface 30 of end windings 10 is fairly small, e.g., about 1.25-2.8 cm. Conventionally, accessing terminal nut 20 requires removing retaining ring(s) 24, at least some of end windings 10 and rotor 14 from stator 12, all of which are time consuming and expensive processes.

BRIEF DESCRIPTION OF THE INVENTION

A first aspect of the disclosure provides a nut torqueing device, comprising: a nut engaging assembly including a plurality of stackable elements, the plurality of stackable elements including: a nut engaging element, at least one stackable riser element configured to stackably connect to one of the nut engaging element and an adjacent stackable riser element therebelow, and a transmission engaging element configured to stackably connect to an uppermost one of the at least one stackable riser element; a ratchet interface between a pair of adjacent stackable elements of the nut engaging assembly allowing rotation of the nut engaging element in only one direction, wherein a rest of the plurality of stackable elements are rotationally interlocked; and a transmission configured to transmit rotational power from a rotational power source to the transmission engaging element of the nut engaging assembly to torque a nut engaged by the nut engaging element of the nut engaging assembly.

A second aspect of the disclosure provides a nut torqueing device for a terminal nut of an electric generator, the nut torqueing device comprising: a nut engaging assembly configured to engage the terminal nut in a recess of a rotor that is radially interior from an end winding of the electric generator, the nut engaging assembly including: a nut engaging element configured to engage the terminal nut in the recess, at least one stackable riser element configured to stackably connect to one of the nut engaging element and an adjacent stackable riser element therebelow, and a transmission engaging element configured to stackably connect to an uppermost one of the at least one stackable riser element; a ratchet interface within the nut engaging assembly allowing rotation of the nut engaging element in only one direction; and a transmission configured to extend between the end windings and the rotor and to transmit rotational power from a rotational power source to the transmission engaging element of the nut engaging assembly to torque the terminal nut engaged by the nut engaging element of the nut engaging assembly.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 7A shows an enlarged cross-section of the pair of stackable riser elements of FIG. 6 in an inoperative position, and FIG. 7B shows an enlarged cross-section of the pair of stackable riser elements of FIG. 6 in an operative position.

FIGS. 8B-C show schematic side views of two alternative ratchet interfaces according to embodiment of the disclosure.

FIGS. 15A-G show side views of a method of using a nut torqueing device according to embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within a turbine and generator. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. It is often required to describe parts that are at differing radial positions with regard to a center axis of the rotor. The term "radial" refers to movement or position perpendicular to an axis of a rotor axis of the generator. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to a rotor axis of the generator. Finally, the term "circumferential" refers to movement or position around an axis. It will be appreciated that such terms may be applied in relation to the center axis of the turbine.

Figure 1:
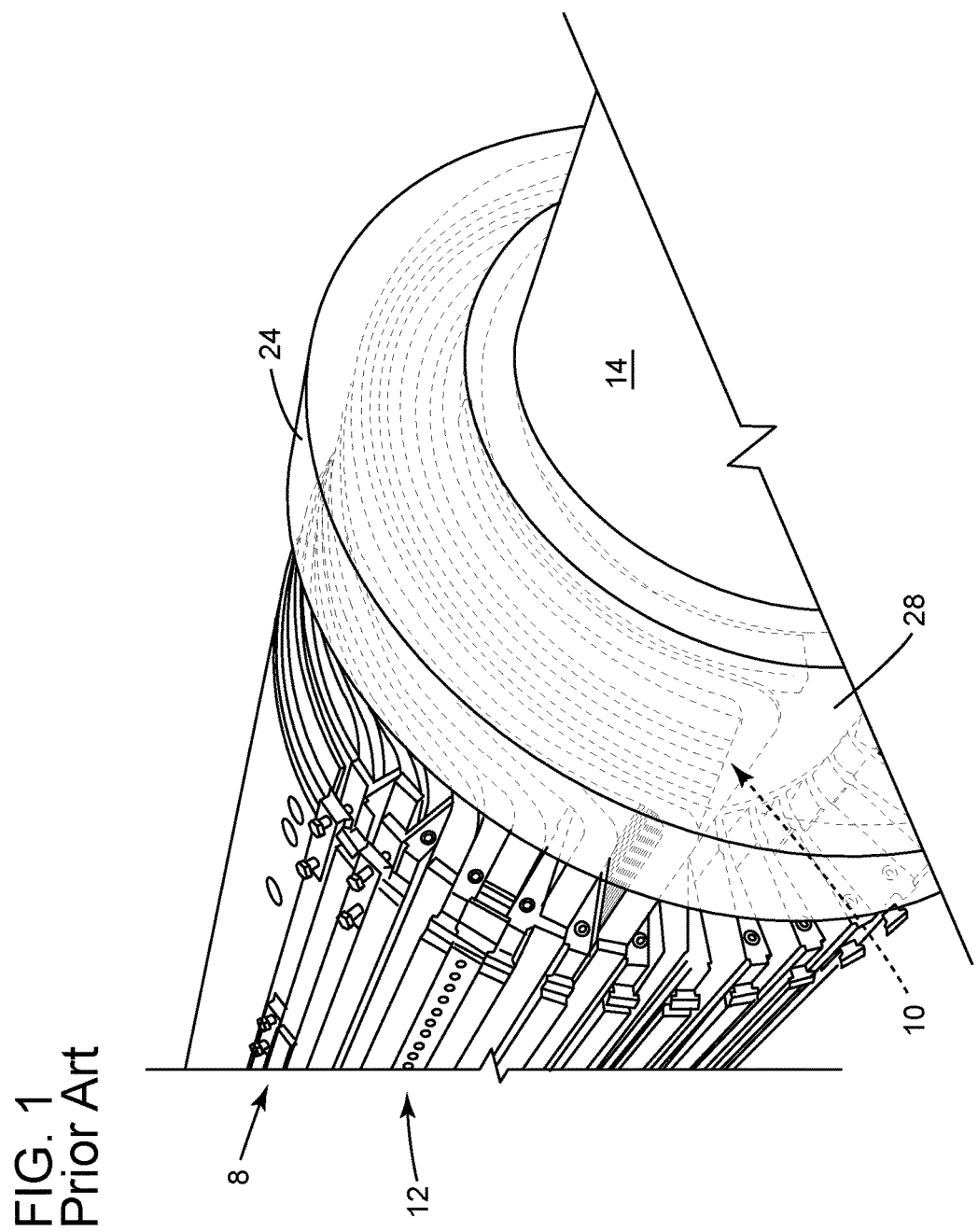
FIG. 1 shows a perspective view of end windings of an illustrative, conventional generator.
Figure 2:
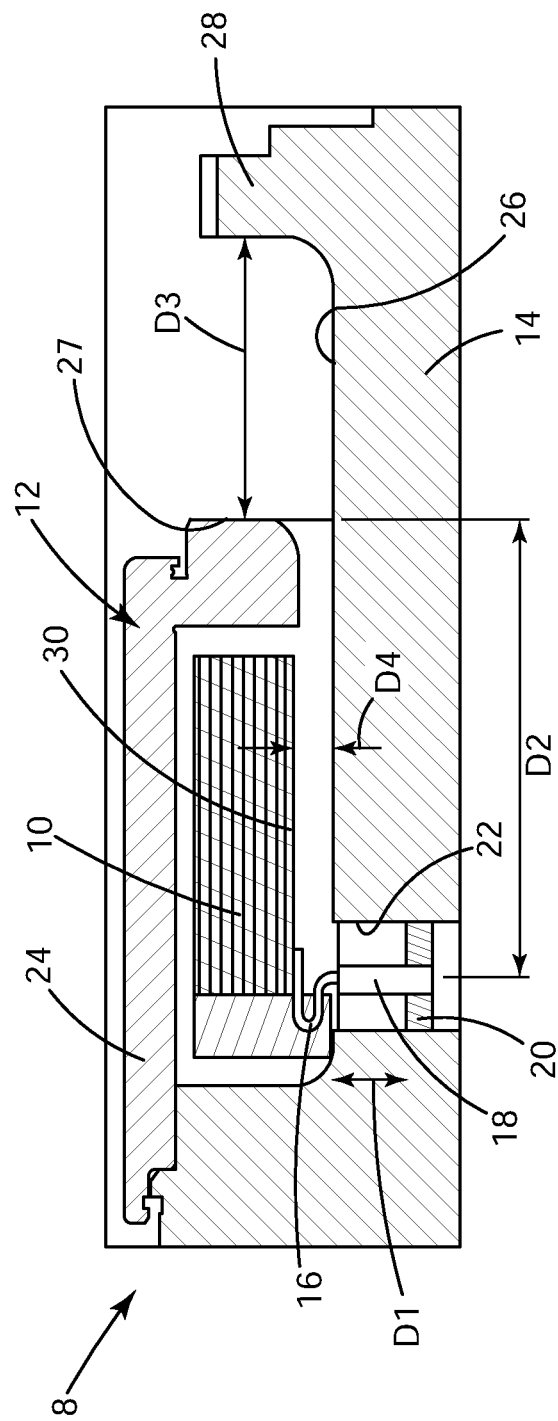
FIG. 2 shows a cross-sectional view of end windings and a terminal nut of the generator of FIG. 1.
Figure 3:
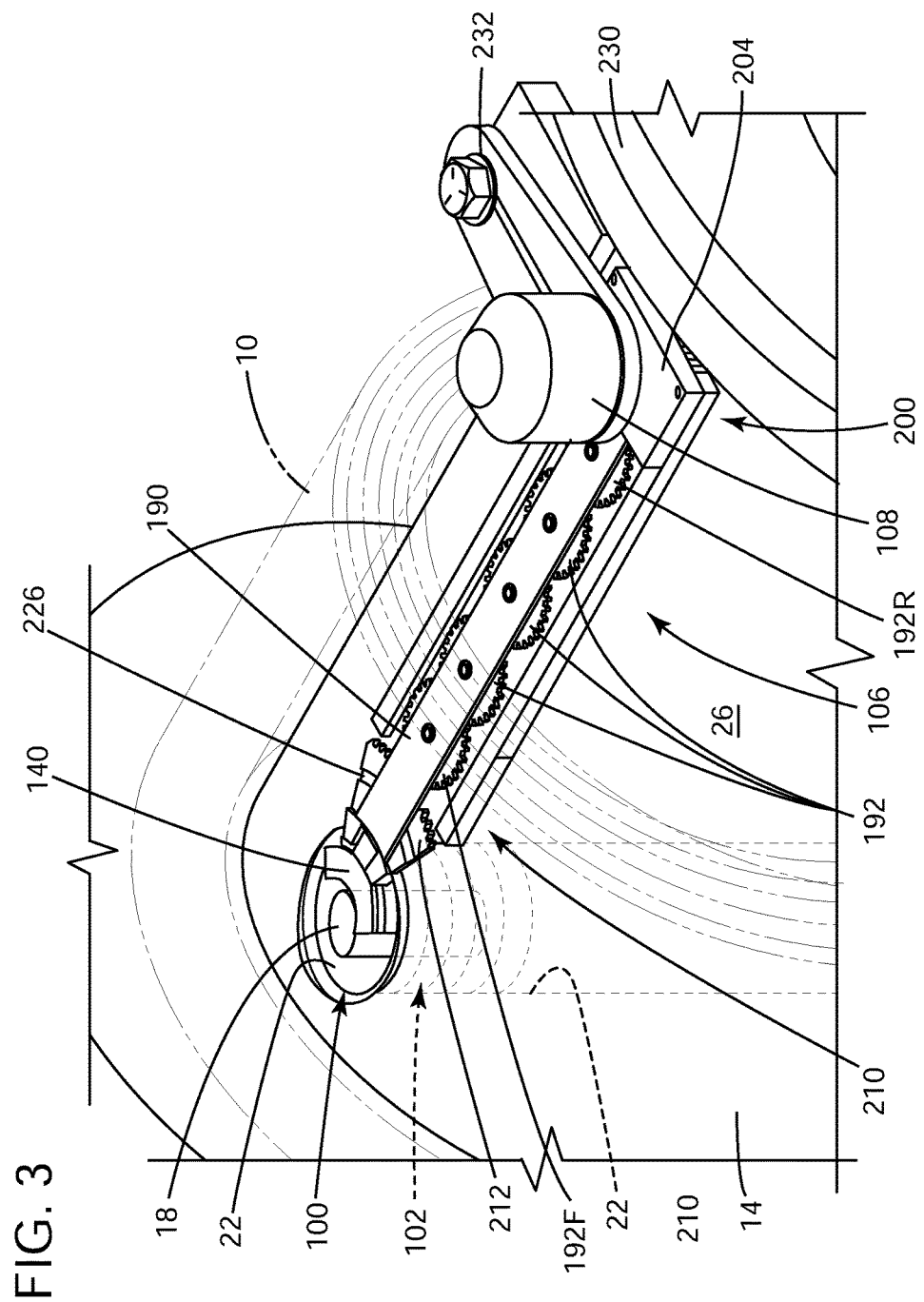
FIG. 3 shows a perspective view of a nut torqueing device on a rotor with end windings removed, according to various embodiments.
Figure 4:
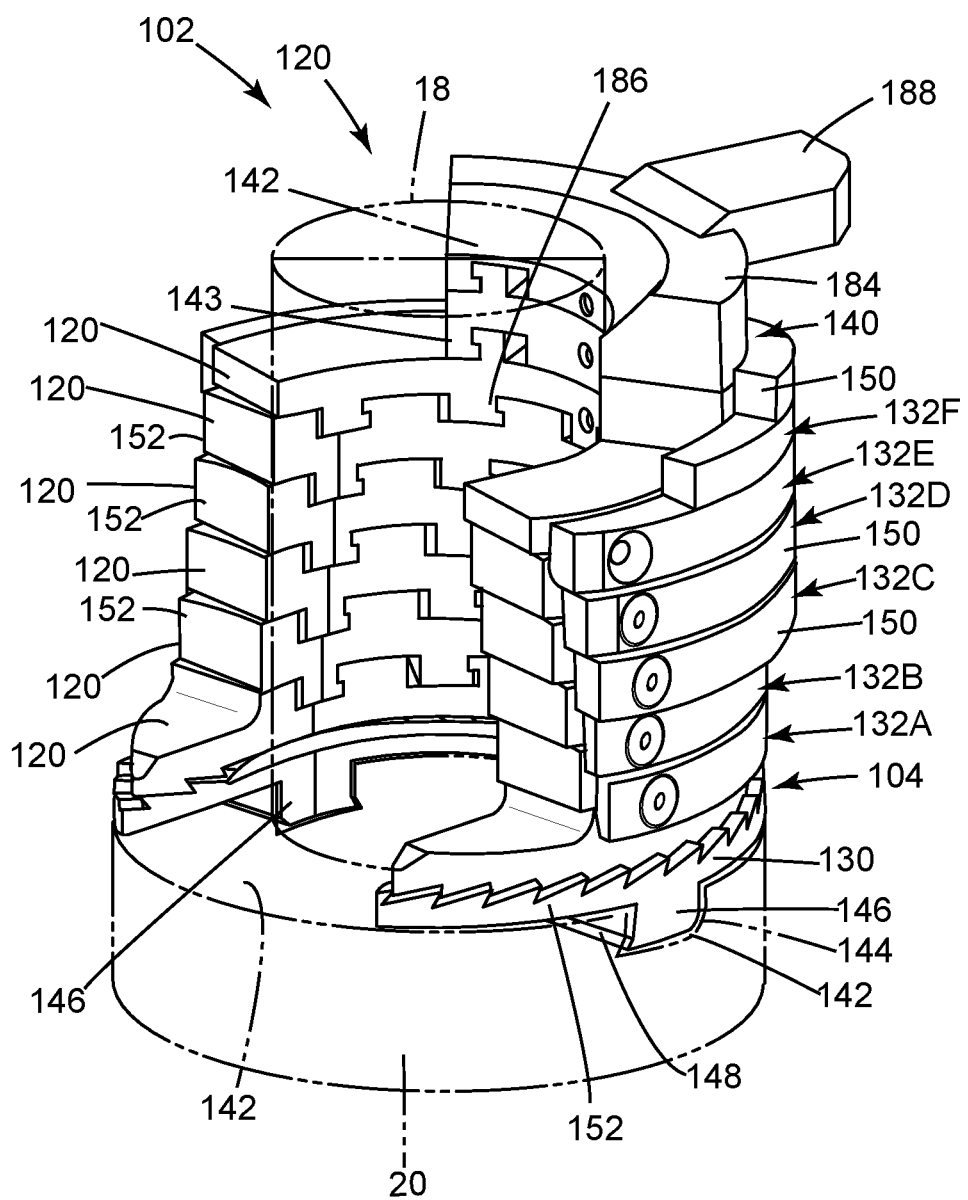
FIG. 4 shows a perspective view of a nut engaging assembly, according to various embodiments.
Figure 5:
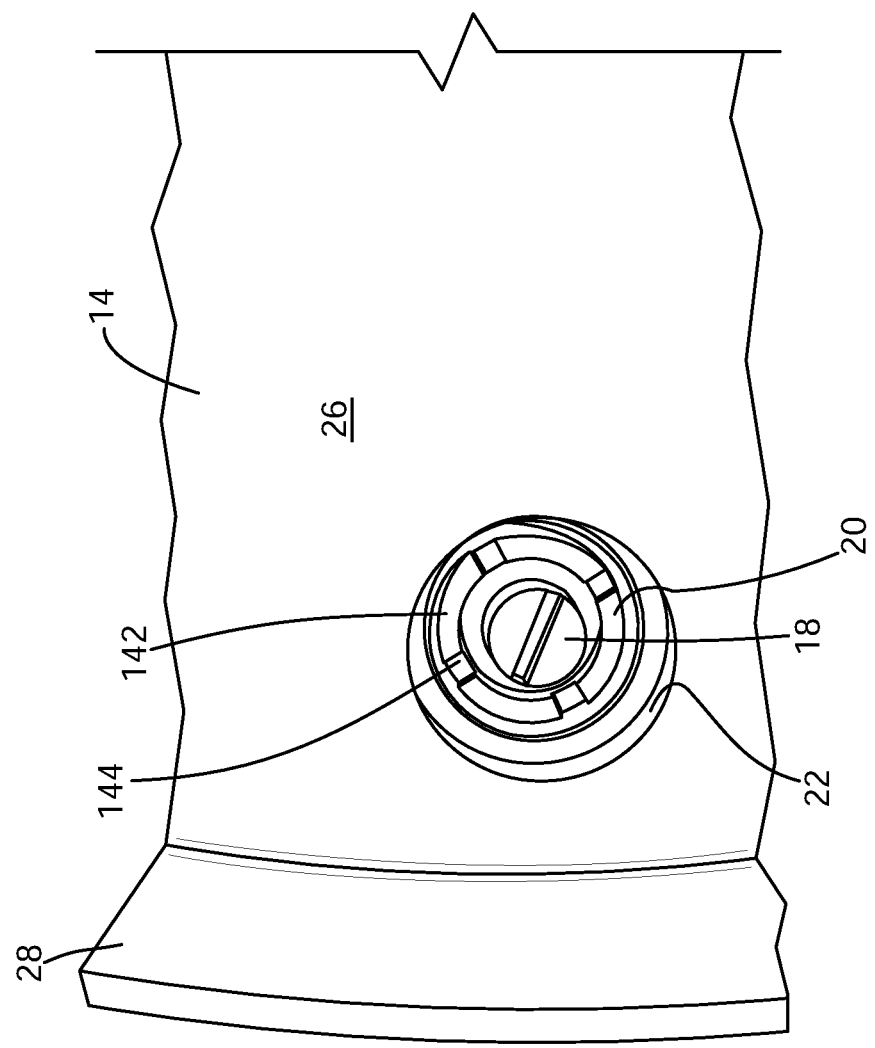
FIG. 5 shows a plan view of a terminal nut in a recess of a rotor.

As indicated above, the disclosure provides a nut torqueing device for an industrial machine such as a main terminal nut of a generator. FIG. 3 shows a perspective view of a nut torqueing device 100 on rotor 14 with terminal 18 (FIG. 2), end windings 10 (FIG. 2) and retainer rings 24 (FIG. 2) removed; and FIG. 4 shows a perspective view of a nut engaging assembly 102, according to various embodiments. As shown in FIGS. 3 and 4, nut torqueing device 100 generally includes nut engaging assembly 102, a ratchet interface 104 (FIG. 4 only) and a transmission 106 for transmitting rotational power from a rotational power source 108 to nut engaging assembly 102. As will be described herein, and as shown best in FIG. 4, nut engaging assembly 102 includes a plurality of stackable elements 120 that individually can be slid between outer surface 26 of rotor 14 and inner surface 30 (FIG. 2) of outer windings 10 (FIG. 2) and stacked within recess 22 within rotor 14. Any manner of tool can be used to direct each stackable element 120 into or out of recess 22, e.g., rods, planar bars, magnetic elements, grasping elements, etc. Proper positioning of each stackable element 120 can be verified using any variety of camera, e.g., borescope, magnetic resonance imaging, etc. Excepting where ratchet interface 104 is provided, stackable elements 120 are configured to rotationally interlock such that rotational power transmitted by transmission 106 can be transferred vertically to terminal nut 20 within recess 22. Transmission 106 also has a low profile so as to easily slide between outer surface 26 of rotor 14 and inner surface 30 (FIG. 2) of outer windings 10 (FIG. 2).

With reference to FIGS. 4-9, details of nut engaging element 102 will now be described. FIG. 4 shows a perspective view of nut engaging element 102 as it would be positioned within recess 22 (FIG. 3) to tighten terminal nut 20 (FIG. 2). As shown, nut engaging assembly 102 may include a plurality of stackable elements 120. Excepting where ratchet interface 104 is provided, stackable elements 120 rotationally interlock. As used herein, "rotationally interlock" indicates that the elements are coupled in such a way as to turn with one another in at least one rotational direction, i.e., such that power for torqueing terminal nut 20 can be transmitted therethrough. Although not necessary in all cases, stackable elements 120 are illustrated as having arcuate bodies 152 (FIG. 4) with open centers, i.e., they are generally U-shaped or C-shaped, so the stackable elements can be placed around terminal 18 (phantom in FIG. 4) during installation and use. Where a structure does not need to extend within stackable elements, they need to have the arcuate shape. Among stackable elements 120 are: a nut engaging element 130, at least one stackable riser element 132 (six shown 132A-F in FIG. 4) configured to stackably connect to nut engaging element 130 or an adjacent stackable riser element 132 therebelow, and a transmission engaging element 140 configured to stackably connect to an uppermost stackable riser element, i.e., 132F as shown.

Terminal nut 20 may include any now known or later structure to position terminal 18 (FIGS. 2 and 4) in recess 22 (FIG. 3). For example, terminal nut 20 may include threads to position terminal 18 in recess 22, i.e., on an interior surface where it engages threads on terminal 18 and/or an exterior surface where it engages threads in recess 22. Nut engaging element 130 may include any form of structure fitting within recess 22 necessary to engage and cause forcible turning of terminal nut 20 (FIGS. 2 and 4). As the form of terminal nut 20 (FIGS. 2 and 4) may vary, so may the structures providing on nut engaging element 130 to engage the nut. In one example, shown in FIGS. 4 and 5, terminal nut 20 includes an upper surface 142 having a number of openings 144 therein. In this setting, as shown in FIG. 4, nut engaging element 130 may include a number of projections 146 configured to engage openings 144 in terminal nut 20. Other possibilities may include but are not limited to: a conventional hexagonal nut/wrench configuration (where space allows) for nut engaging element to interact about nut 20, pin openings in terminal nut 20 with corresponding pins extending from nut engaging element 130, a ratchet interface between upper surface 142 of terminal nut 20 and an underside of nut engaging element 130.

Returning to FIG. 4, each stackable riser element 132 is configured to stack atop either nut engaging element 130 (lowermost riser element 132A) or another adjacent stackable riser element therebelow. In this fashion, one or more stackable riser elements 132 can be selected that has a height configured to extend outwardly from recess 22 and create a structure through which torque can be passed to nut engaging element 130. The number of stackable riser elements 132 employed can be based on a number of factors such as but not limited to: the depth of recess 22, and the height of each riser element 132 which may be dictated by distance D4 between outer surface 26 of rotor 14 and inner surface 30 of end windings 10. In one embodiment, for example, nut engaging element 130 and each stackable riser element 132, individually, have a height of no greater than 1.25 centimeters. Similarly, each of nut engaging element 130, and stackable riser element(s) 132, individually, may have a width of no greater than 5 centimeters (at widest location). In the example shown in FIG. 4, nut engaging assembly 102 includes six stackable riser elements 132A-F of substantially equal heights. (FIGS. 8B-C show different numbers of elements 132). While each stackable riser element 132 is illustrated as being substantially identical in shape, that need not be the case in all instances. In one embodiment, although not necessary in all instances, each stackable riser element 132 may include an arcuate rim 150 extending therefrom for aligning each stackable riser element 132 with an adjacent stackable element 120. For example, an arcuate rim 150 on stackable riser element 132D may be configured to engage an outer surface of arcuate body 152 of stackable riser element 132C therebelow so as to align stackable riser element 132D with stackable riser element 132C. A lowermost stackable riser element 132A may have an arcuate rim 150 thereon configured to engage an outer surface of arcuate body 152 of nut engaging element 130 so as to align stackable riser element 132A with nut engaging element 130. It is emphasized that the outer shape of each stackable element 120 can take a variety of different shapes other than arcuate, e.g., polygonal, oblong, etc., and rim 150 changed to accommodate the different shapes. In one embodiment, each stackable element 120 could have a unique outer shape so as to mate with a rim 150 having a matching shape of one and only one stackable element 120 intended to be placed thereover.

Figure 9:
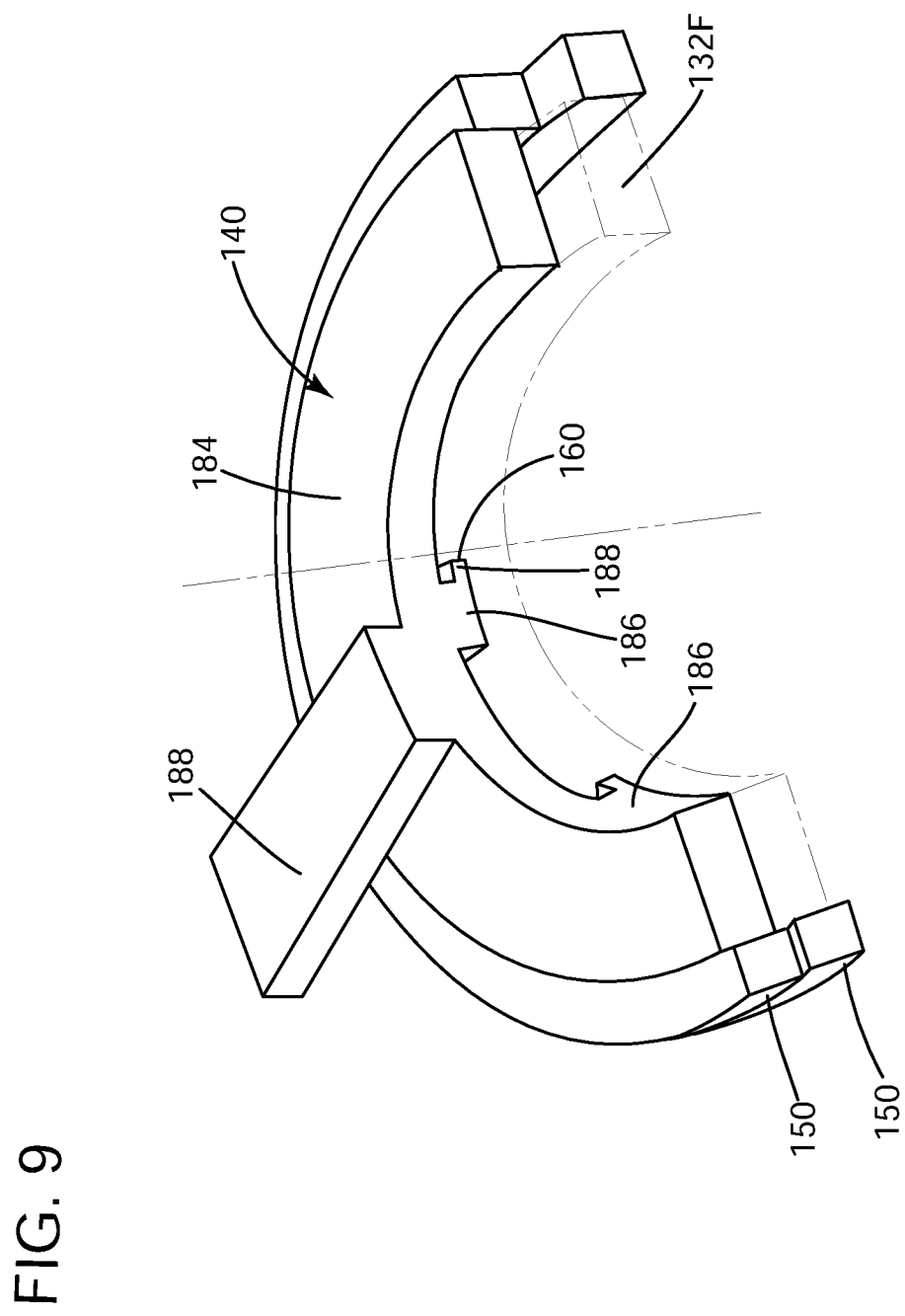
FIG. 9 shows a perspective view of a transmission engaging element according to embodiments of the disclosure.

Transmission engaging element 140 is configured to stackably connect to an uppermost one of the at least one stackable riser element, e.g., stackable riser element 132F (FIGS. 4 and 9). As will be described herein, transmission engaging element 140 provides a structure to which transmission 106 can be operatively coupled to provide a rotational force to nut engaging assembly 102 to torque nut 20.

Figure 6:
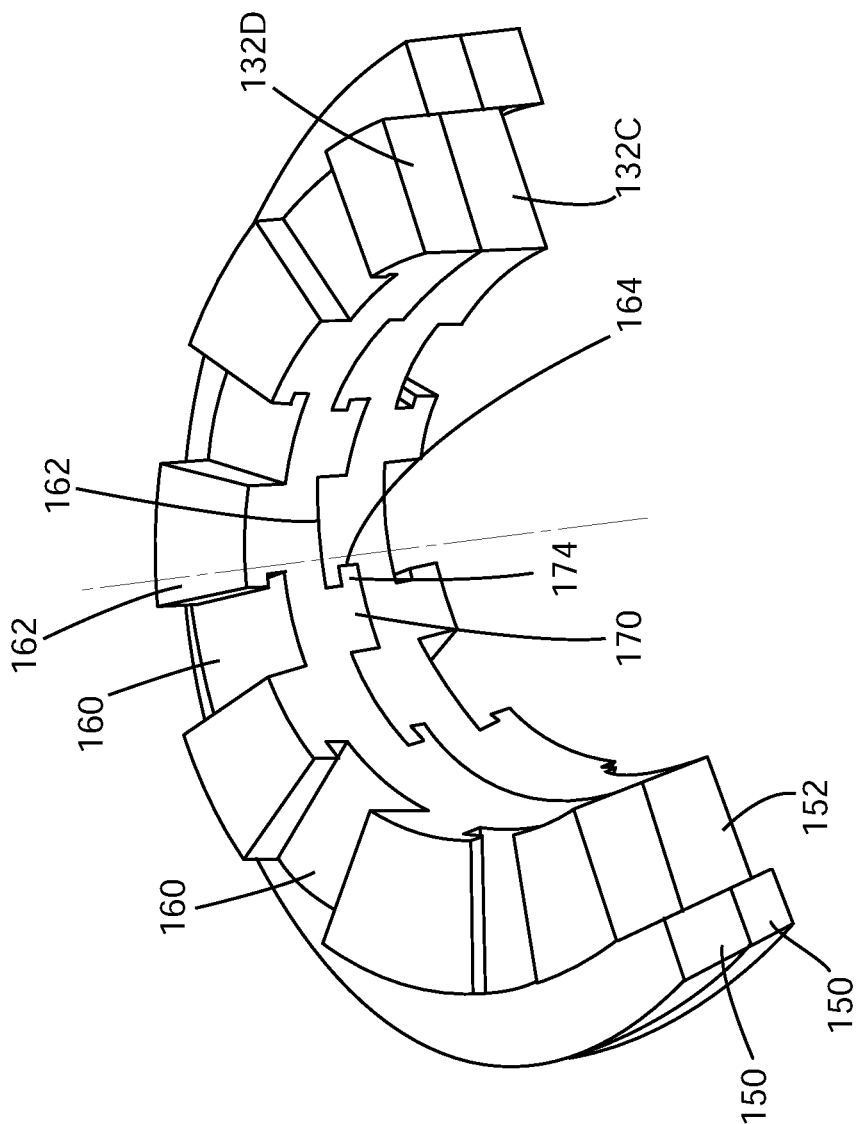
FIG. 6 shows a perspective view of a pair of stackable riser elements of the nut engaging assembly rotationally interlocked, according to various embodiments.

Stackable riser elements 132 are configured to be selectively rotationally interlocked to one another in a stacked fashion to allow for torque to be applied through nut engaging assembly 102. As will be recognized, there are a wide variety of ways to mechanically interlock stackable riser elements 132. FIG. 6 shows a perspective view of one example of two stackable riser elements, e.g., 132C, 132D, in an engaged arrangement; and FIGS. 7A and 7B show enlarged side views of the two stackable riser elements in an engaged, but inoperative position (FIG. 7A) and an engaged and operative position (FIG. 7B). While FIGS. 6, 7A and 7B show just riser elements 132C, 132D, the teaching are applicable to any riser element 132. In the example shown in FIGS. 6, 7A and 7B, each stackable riser element 132C, 132D includes an opening(s) 160 in a first side 162 thereof. Each opening 160 includes a recess 164 extending outwardly from the opening, e.g., in a circumferential direction along arcuate body 152 of the respective riser element. Each stackable riser element 132C, 132D also includes a projection(s) 170 extending from a second side 172 thereof. Each projection 170 includes a ledge 174 for engaging with a respective recess 164 in a respective opening 160 on first side 162 of an adjacent stackable riser element. Each ledge 174 extends outwardly from projection 170, e.g., in the same circumferential direction along arcuate body 152 of the respective riser element as recess 164. Although not necessary, there would typically be a one-to-one match between openings 160 and projections 170. FIG. 6 shows a number of openings and projections, while FIGS. 7A and 7B show only one of each.

As shown in FIG. 7A, from a separated position, a stackable riser element 132D may be engaged relative to an adjacent stackable riser element 132C. Projection(s) 170 of riser element 132D may be positioned into opening(s) 160 of riser element 132C, and the riser elements brought into close, stacking proximity. In this engaged but inoperative position, ledge 174 of projection(s) 170 passes into an upper portion 176 of opening(s) 160 freely and is disengaged from recess 164, allowing entry or removal of projection(s) 170 from opening(s) 160. As shown in FIG. 7B, however, upon application of torque to riser element 132D (see arrow), riser element 132D rotationally slides relative to riser element 132C to enter an engaged, operative position. In this position, ledge 174 engages with recess 164 to prevent removal of projection 170 from opening 160 and rotationally interlocks first and second stackable riser elements 132C, 132D. Riser elements 132C, 132D cannot separate vertically (as shown) in this position. As shown by the arrow in FIG. 7B, the rotational power torqueing of nut engaging assembly 102 is in a direction that forces nut engaging assembly 102 to the engaged, operative position. In this fashion, nut engaging assembly 102 forms a unitary torque transmitting structure even though it is made of many stacked elements. Practically any number of stacked elements 120 can be employed to reach a terminal nut 20 in the bottom of a recess in this fashion.

Figure 8A:
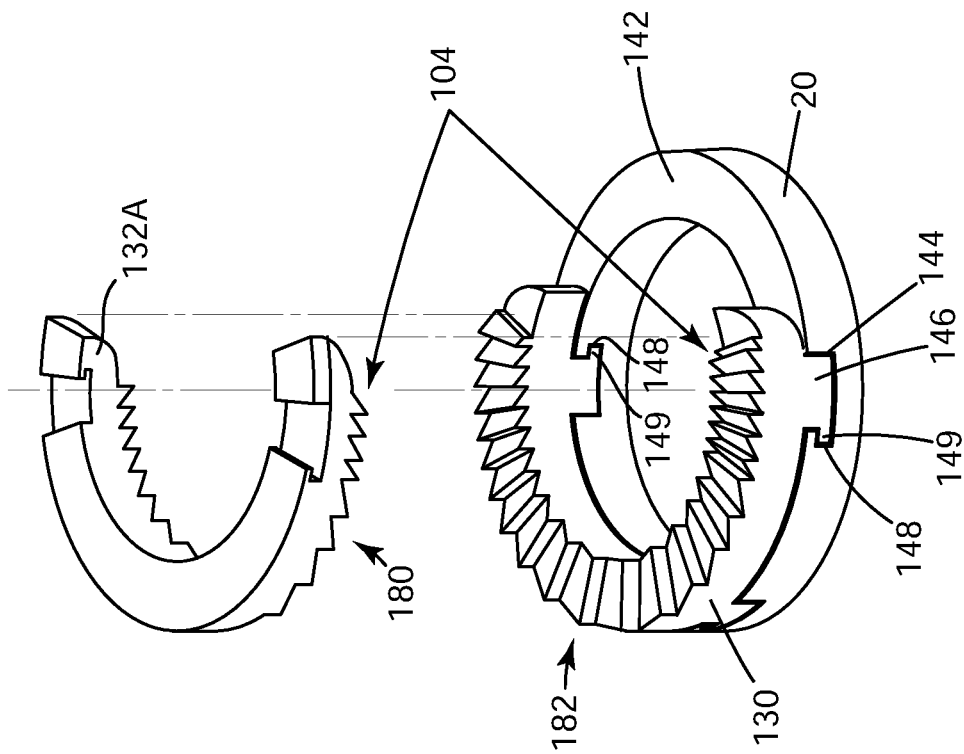
FIG. 8A shows an exploded perspective view of a ratchet interface according to embodiment of the disclosure.

As shown best in FIG. 8A, projections 146 of nut engaging element 130 may have a similar interlocking arrangement with openings 144 of terminal nut 20. That is, openings 144 in nut 20 may have a recess 148 (FIG. 8A) therein that interlocks with a ledge 149 of projection 146 when nut engaging element 130 is turned by torque applied through nut engaging assembly 102. Furthermore, as shown in FIG. 9, transmission engaging element 140 may have a similar interlocking arrangement with an uppermost stackable riser element 132F. In one embodiment, transmission engaging element 140 may include an arcuate body 184 configured to selectively, rotationally interlock with the uppermost one of the at least one stackable riser elements, e.g., 132F in FIG. 4. Further, transmission engaging element 140 may include a number of projections 186 that engage in corresponding openings 160 in uppermost stackable riser element 132F. Projections 186 may extend from a bottom of arcuate body 184. Openings 160 in uppermost stackable riser element, e.g., 132F, may have recesses 164 therein, as described herein, and projections 186 of transmission engaging element 140 may have a lug 188 (FIG. 9) that engage recess 164 when transmission engaging element 140 is turned by torque applied thereto by transmission 106. As shown in FIGS. 4 and 9, transmission engaging element 140 may also include a lug 188 extending from arcuate body 184 for operative coupling to transmission 106, as will be described herein. Lug 188 extends above arcuate body 184 such that, in operation, as shown best in FIG. 8B, nut engaging assembly 102 extends below a lower surface 228 of gear box 190, i.e., into recess 22. Although not necessary, as illustrated in FIG. 4, transmission engaging element may include a number of elements 141, 143 that interlock similarly to other stackable elements 120, described herein.

As noted, and as shown in FIGS. 4 and 8A-C, ratchet interface 104 may be positioned between a pair of adjacent stackable elements 120 of nut engaging assembly 102 allowing rotation of nut engaging element 130 in only one direction, e.g., clockwise to tighten. In the example shown in FIGS. 4 and 8A, ratchet interface 130 is positioned between nut engaging element 130 and a lowermost stackable riser element 132A. It is emphasized, however, that ratchet interface 104 may be located between practically any pair of stackable elements 120. For example, as shown schematically in FIG. 8B, ratchet interface 104 may be located between a pair of adjacent stackable riser elements, e.g., 132C and 132D as shown, or, as shown schematically in FIG. 8C, between an uppermost one of the at least one stackable riser elements, e.g., 132B as shown, and transmission engaging element 140. In any event, ratchet interface 104 includes a pair of opposed ratchet surfaces 180, 182 that allow for rotational slippage between surfaces when forced in a first rotational direction, e.g., counterclockwise as shown, and rotational engagement between surfaces when forced in the opposite rotational direction, e.g., clockwise as shown. In this fashion, a torque applied to nut engaging assembly 102 acts to only tighten terminal nut 20. As nut engaging assembly 102 is turned in the non-engaging rotational direction, e.g., counterclockwise, ratchet surfaces 180, 182 slide over one another, and may raise stackable elements 20 thereover slightly, so no torque is transmitted.

Figure 8D:
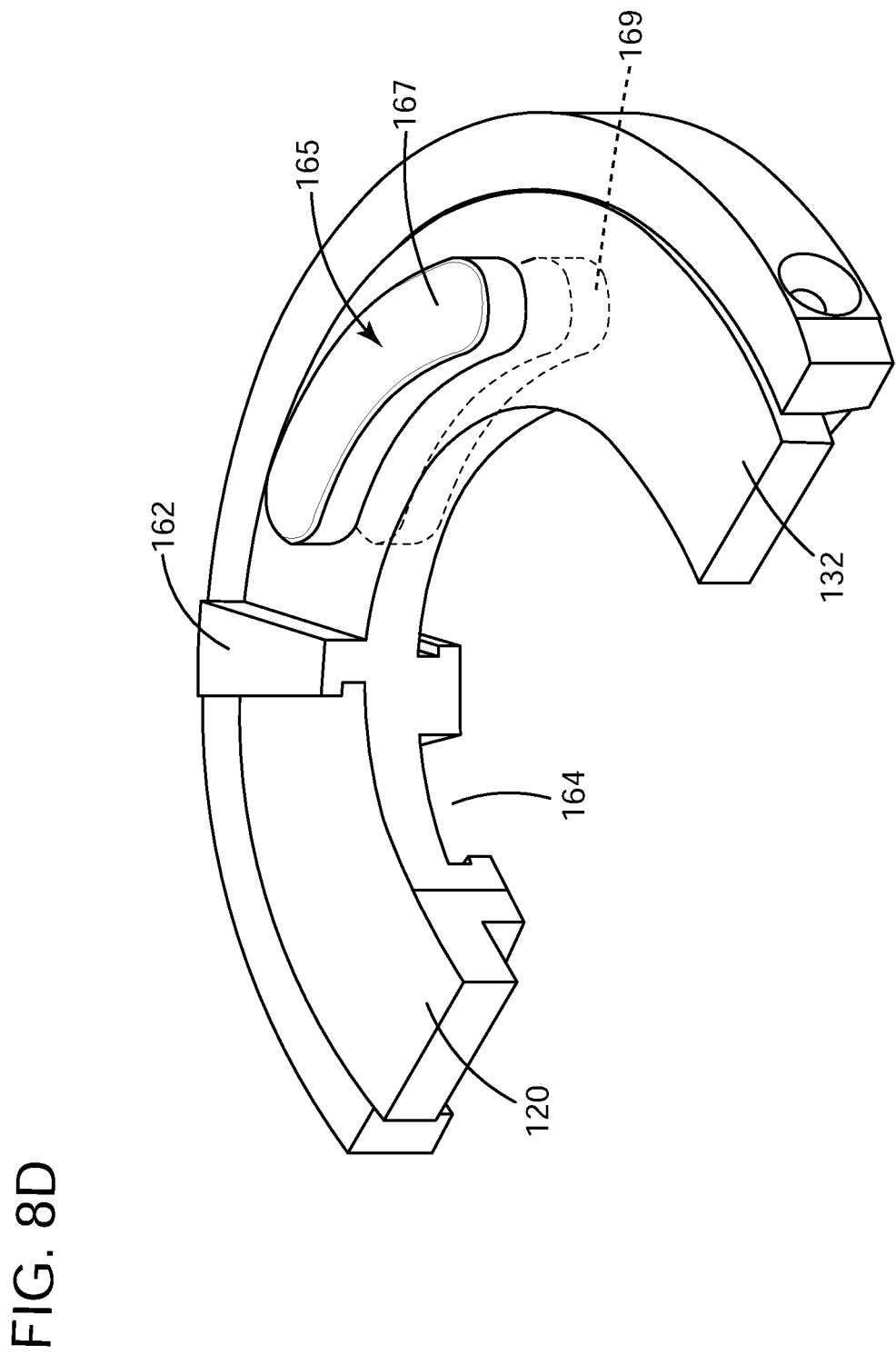
FIG. 8D shows a perspective view of an optional alignment structure for stackable elements according to embodiments of the disclosure.

FIG. 8D shows a perspective view of an optional alignment or locking structure 165 according to embodiments of the disclosure. As illustrated, alignment structure 165 may include a curved projection 167 configured to mate with a curved opening 169 (in phantom) in an underside of an adjacent stackable element 120 to assist in maintaining aligned curvilinear movement and ensure transmission of torque through nut engaging assembly 102. While shown on a stackable riser element 132, alignment structure may also be employed on nut engaging element 130 (where it does not include ratchet interface 104), or on transmission engaging element 104 (bottom only).

Figure 10:
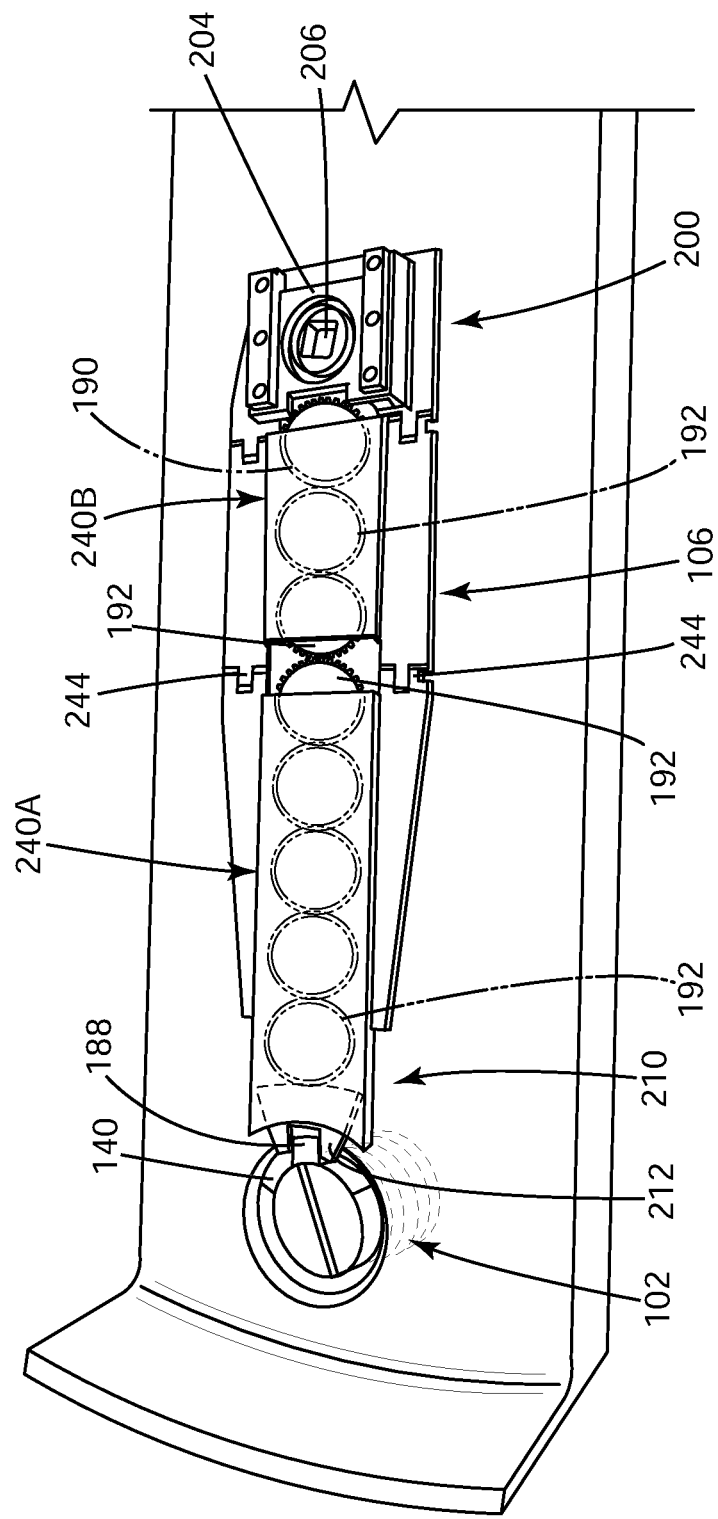
FIG. 10 shows a top perspective view of a transmission according to embodiments of the disclosure.
Figure 11:
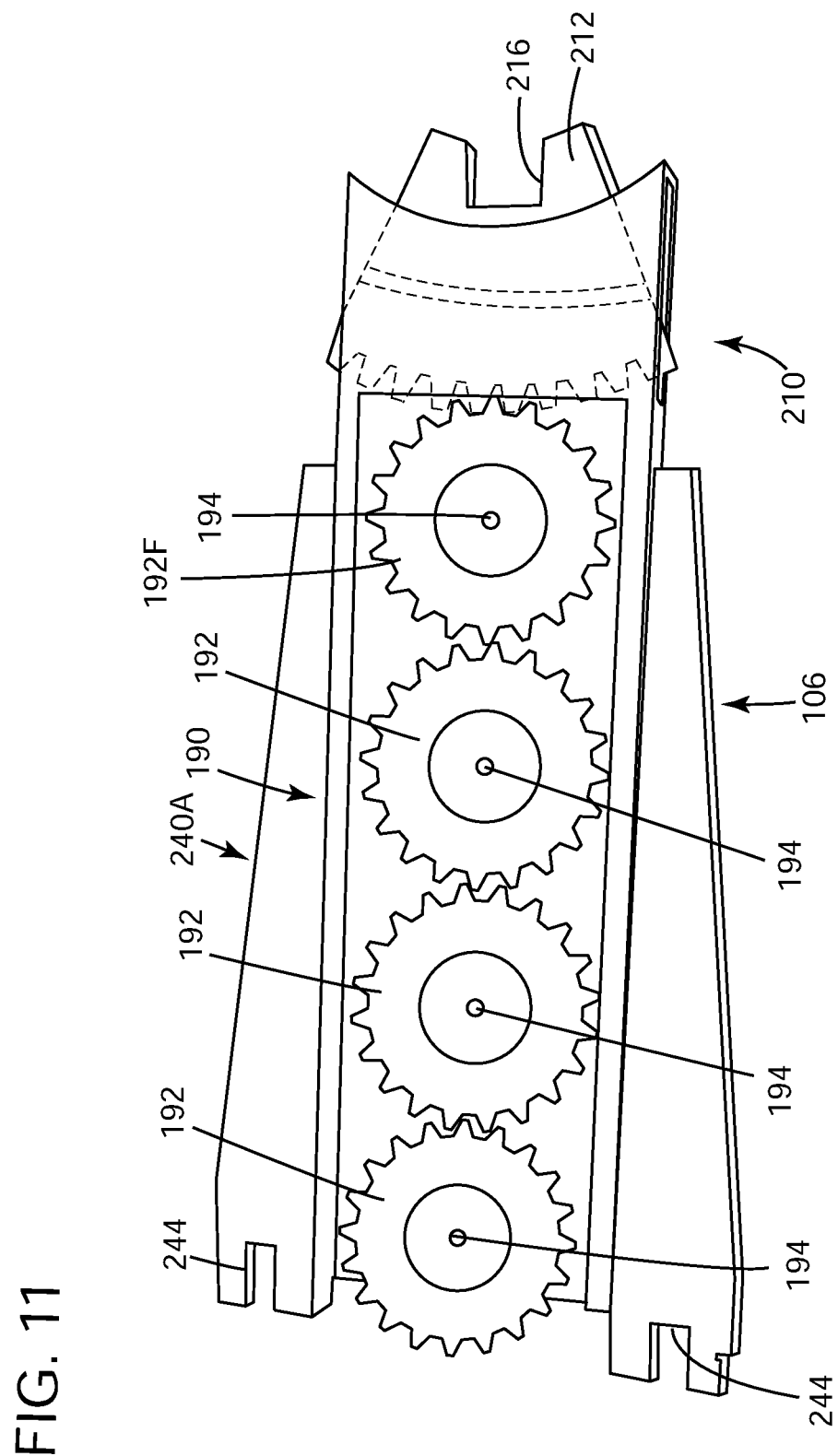
FIG. 11 shows a bottom view of a transmission according to embodiments of the disclosure.
Figure 12:
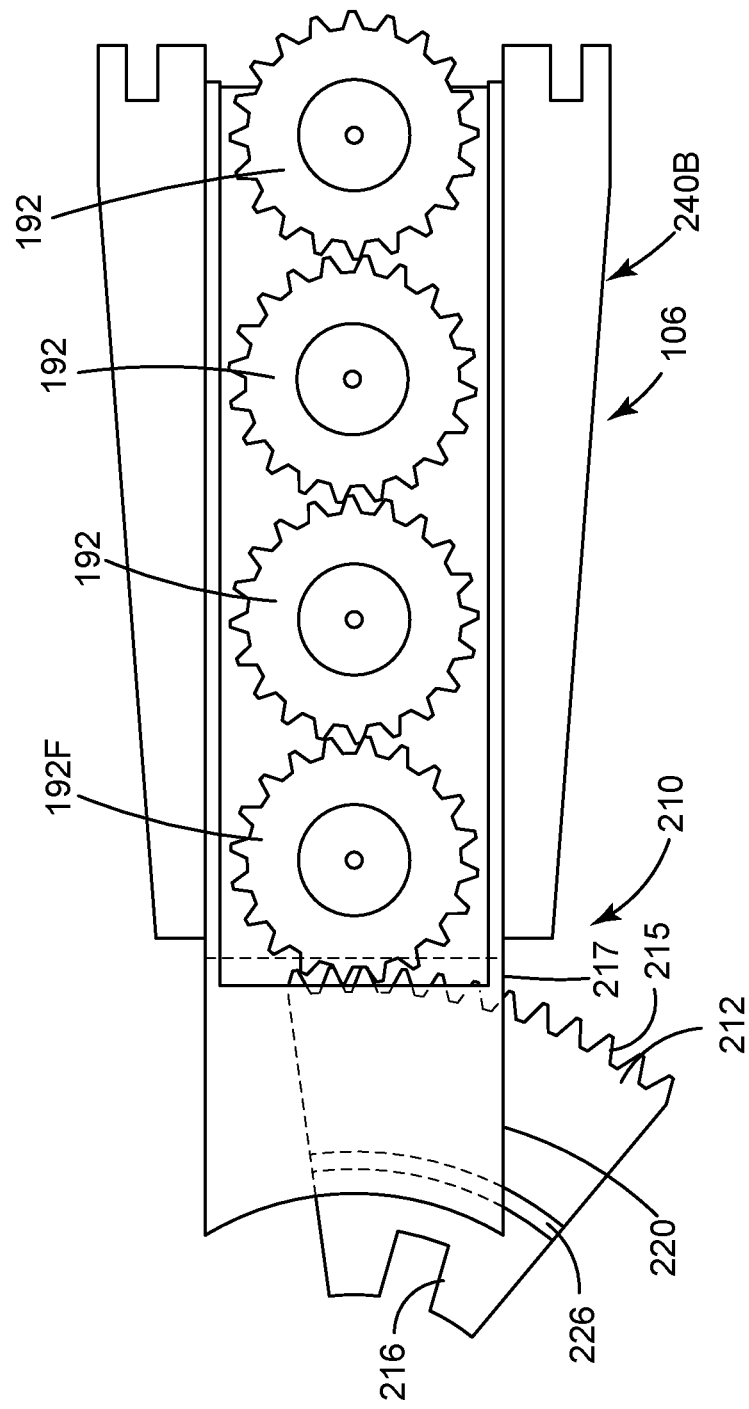
FIG. 12 shows a bottom view of a fan gear at a distal end of a transmission according to embodiments of the disclosure.
Figure 13:
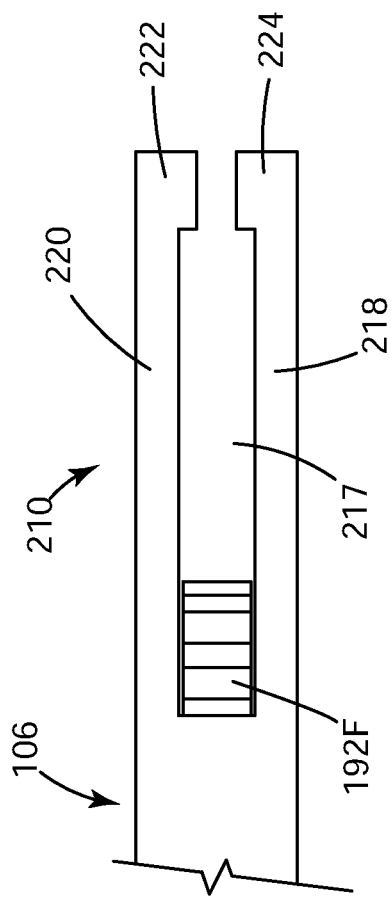
FIG. 13 shows a side view of a distal end of a transmission with fan gear removed according to embodiments of the disclosure.

Referring to FIGS. 3, 10-13, details of transmission 106 will now be described. FIG. 10 shows a top perspective view of transmission 106; FIG. 11 shows a bottom view of one segment of transmission 106; FIG. 12 shows a bottom view of transmission with a fan gear thereof exposed; and FIG. 13 shows a side view of a distal end of transmission 106 with a fan gear removed. As noted, transmission 106 is configured to transmit rotational power from a rotational power source 108 (FIG. 3) to transmission engaging element 140 of nut engaging assembly 102 to torque terminal nut 20 engaged by nut engaging element 130 of nut engaging assembly 102. Transmission 106, as illustrated for example in FIGS. 3 and 15G, is also configured to extend between outer surface 26 of rotor 14 and inner surface 30 of end windings 10 (in phantom) to engage transmission engaging element 140. In one embodiment, transmission 106 includes a gear box 190 including a plurality of meshing gears 192. In the example shown in FIGS. 10 and 11, meshing gears 192 are mounted within gear box 190, e.g., on shafts 194, and intermesh for transmitting rotational power therethrough. Any number of gears 192 may be employed, e.g., 8 gears are shown in phantom in FIGS. 10, and 5 gears are shown in FIG. 3. Gear box 190 is shaped to provide support for gears 192 and, as shown in FIG. 10, may cover them when in an operational state. In this case, although not necessary, an underside of gear box 190 may be exposed, as shown in FIG. 11, to allow access to gears 192, e.g., for applying lubricant, repair, replacement with different sized gears, etc. Alternatively, as shown in FIG. 3, gears 192 may be exposed from a top. Gears 192 may also be entirely enclosed.

As shown in FIG. 10, at a proximal end 200 of transmission 106, i.e., adjacent rotational power source 108 (FIG. 3), transmission 106 includes a coupler 204 for selectively coupling transmission 106 with rotational power source 108. Coupler 204 may include any now known or later developed mechanism for rotationally coupling an output of rotational power source 108 with a power coupling gear 192R (FIGS. 3 and 10) of meshing gears 192 of transmission 106. In the example shown, coupler 204 includes a socket 206 that mates with an output shaft (not shown) of rotational power source 108. A gear of the meshing gears 192 closest to coupler 204 acts as a power coupling gear 192R that operatively couples the rest of the plurality of meshing gears 192 to rotational power source 108.

As shown in FIGS. 3 and 10, transmission 106, at a distal end 210, operatively couples with transmission engaging element 140 of nut engaging assembly 102 to transmit a torque thereto. It is noted that the particular embodiments of transmission 106 and transmission engaging element 140 are only illustrative and they may take a variety of alternative forms within the scope of the disclosure. In one embodiment, as shown best in FIGS. 11-13, distal end 210 of transmission 106 may include a fan gear 212 that meshes on one side thereof with a fan coupling gear 192F of the plurality of meshing gears 192 using an arced set of gears 215 (FIG. 12) thereof. On the opposing side, fan gear 212 includes a slot 216 configured to mesh with lug 188 of transmission engaging element 140 of nut engaging assembly 102. As shown in FIGS. 12 and 13 (fan gear removed from FIG. 13), fan gear 212 travels within a slot 217 (FIG. 13) between two plates 218, 220 (FIG. 13) coupled to gear box 190 (e.g., welded or otherwise fastened) that allow (perhaps limited) arcuate movement of fan gear 212. In one embodiment, each plate 218, 220 may include an arcuate projection 222, 224 (FIG. 13) that mate with arcuate grooves 226 (FIG. 12) in opposing sides of fan gear 212 to control the path of travel of fan gear 212 to ensure meshing with fan coupling gear 192F. FIG. 3 shows an alternative embodiment in which projections (within groove 226 of fan gear 212) are within a portion of gear box 190. In any event, as shown in FIGS. 3 and 10, lug 188 of transmission engaging element 140 engages with slot 216 in fan gear 212 such that rotation of fan gear 212 transmits a rotational movement to the nut engaging element 140 of nut engaging assembly 102 to tighten terminal nut 20 (FIG. 3). As shown in FIG. 8B, nut engaging assembly 104 extends below a lower surface 228 of gear box 190.

Referring to FIGS. 3 and 15G, rotational power source 108 may be anchored to a rotor flange 230, e.g., using any form of mount 232 for temporary fixation thereof to rotor flange 230. Rotational power source 108 may include any now known or later developed torque applying device, e.g., a motor powered by an electric, pneumatic, or hydraulic means. Rotational power source 108 should be able to apply torque in both a clockwise and counterclockwise direction.

Figure 14:
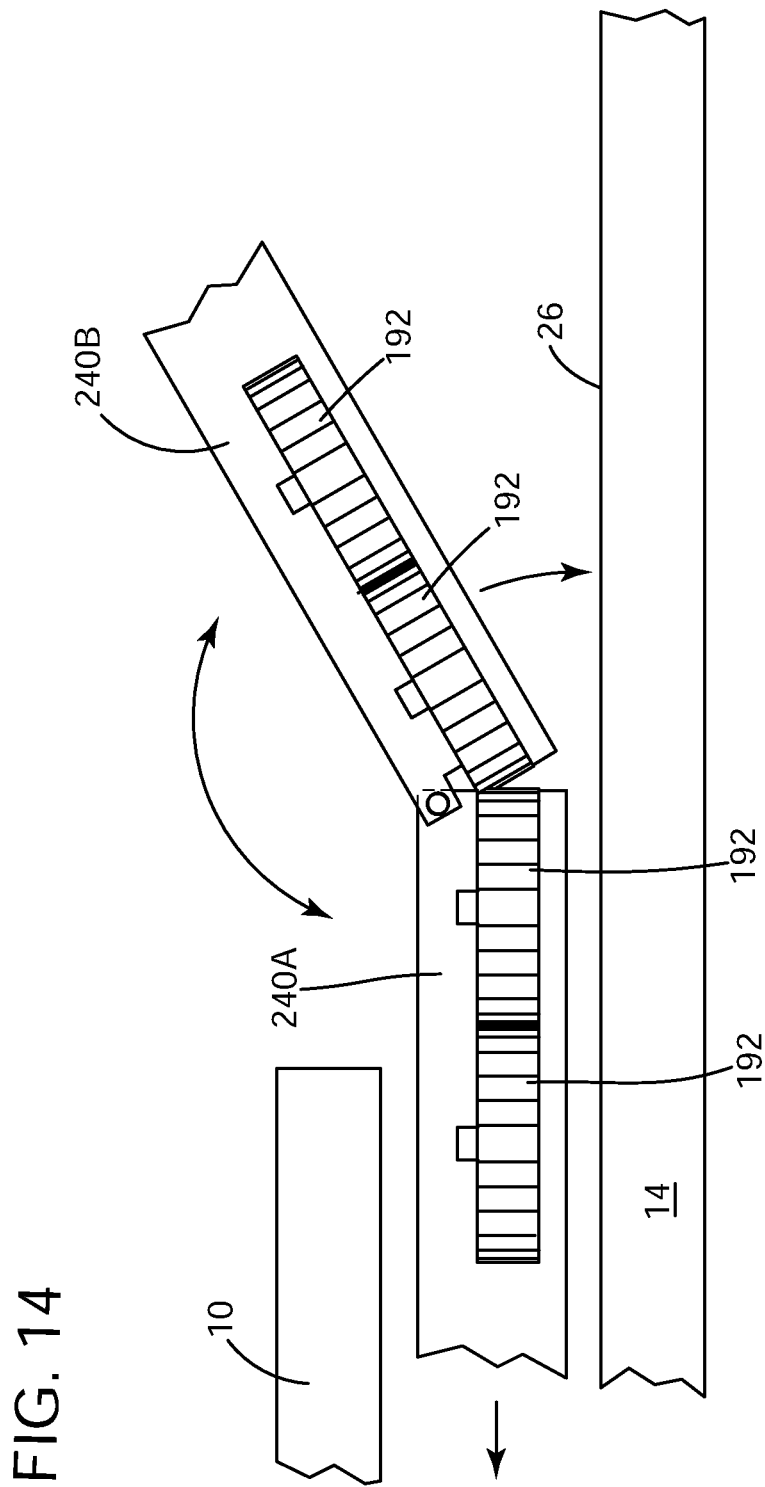
FIG. 14 shows a side view of a segmented gear box of a transmission according to embodiments of the disclosure.

In some applications, space may be so limited such that transmission 106 as illustrated as a one-piece unit in FIG. 3 may not be able to be inserted between rotor flange 230 and end windings 10. In order to address this situation, in one embodiment, transmission 106 may be segmented to allow for installation thereof in smaller parts. For example, as shown in FIG. 10, gear box 190 of transmission 106 may include two or more gear box segments 240A, 240B, etc., (two shown in FIG. 10) that are coupled at coupling points 244. Each gear box 240A, 240B may include one or more meshing gears 192 and, depending on intended location, one of coupling gears 192R or 192F. Coupling points 244 may include any now known or later developed fasteners for operatively positioning gear box segments 240A, 240B to ensure meshing of gears 192. In one embodiment, coupling points 244 may be simple fasteners for fixing the position of gear box segments 240A, 240B when used, e.g., a simple pinned connection, a pivot in a catch connection, etc. In this case, one gear box segment 240A with fan gear 212 may be slid between end windings 10 and rotor 14, and one or more other gear box segments 240B coupled sequentially to gear box segment 240A until enough length is provided to reach a desired connection with rotational power source 108. In another embodiment, as shown in FIG. 14, gear box segments 240A, 240B may be hingedly coupled so transmission 106 can be folded or unfolded. The hinges may include any now known or later developed hinged connection capable of allowing gear box segments 240A, 240B to mate and allow respective end meshing gears 192 thereof to operationally mate. In this case, transmission 106 may be partially unfolded, one gear box segment 240A with fan gear 212 (FIG. 12) may be slid between end windings 10 and rotor 14, and one or more other gear box segments 240B unfolded sequentially along rotor 14 until transmission is in position to reach a desired location for connection with rotational power source 108.

It is understood that transmission 106 may be segmented in alternative manners than those described herein. Further, although transmission 106 has been described herein as including a plurality of gears, alternative forms of power transmission to nut engaging assembly 102 may be employed where space permits, e.g., chain transmission, hydraulic or pneumatic power transmission, electric power transmission, etc.

Figure 15A:
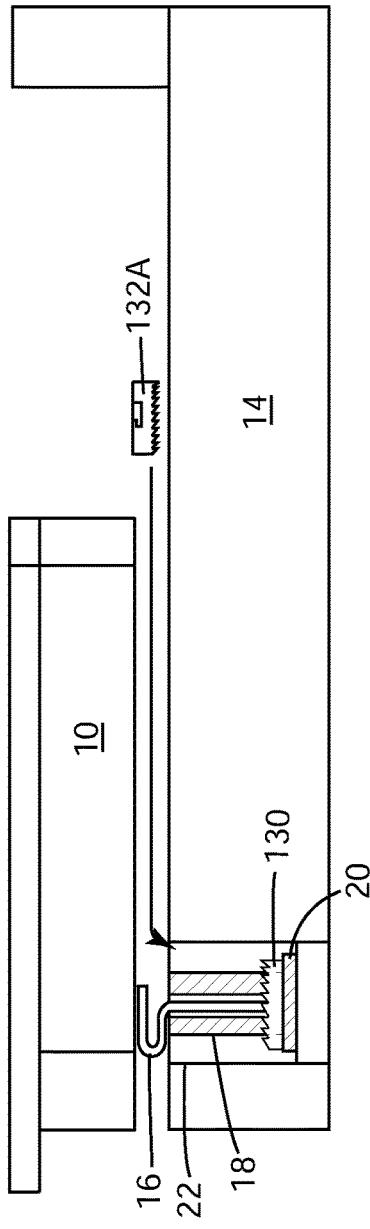
Figure 15B:
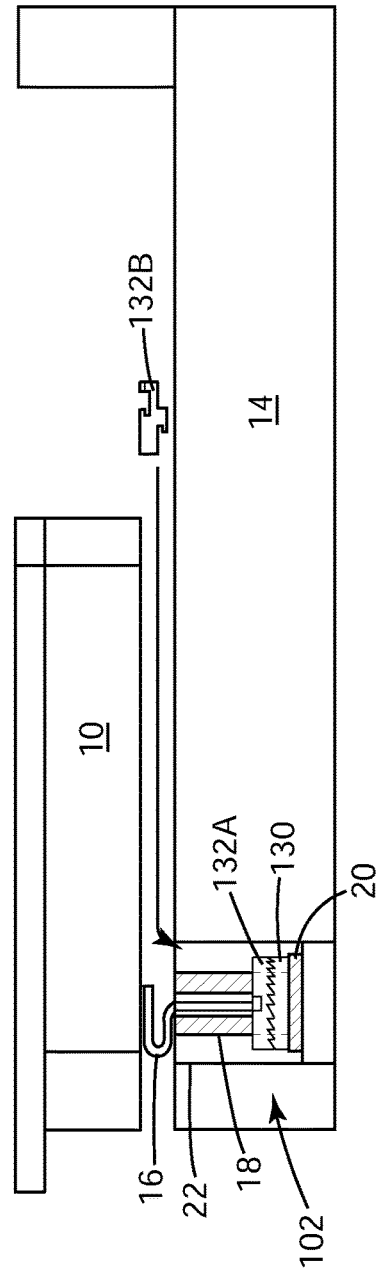
Figure 15C:
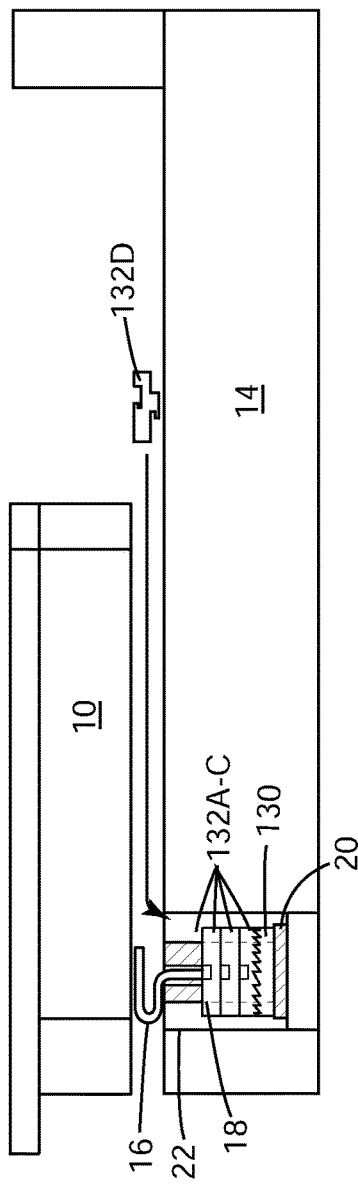
Figure 15D:
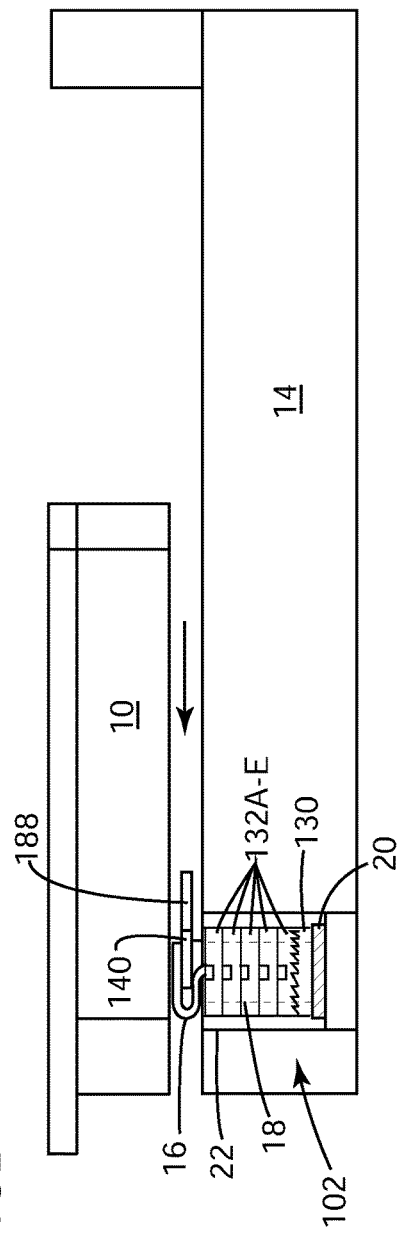
Figure 15G:
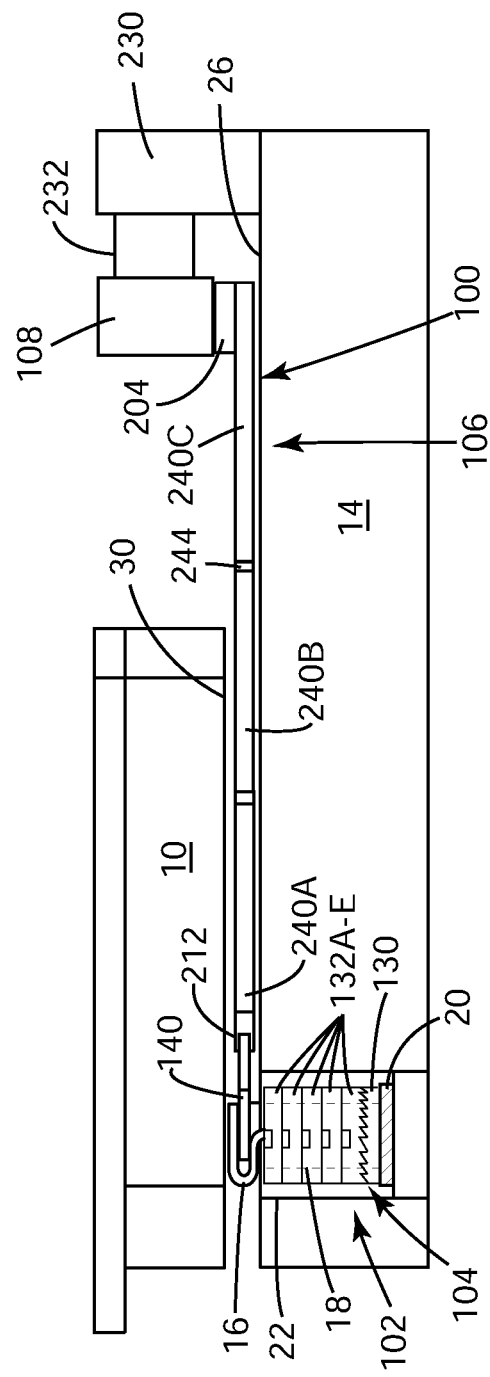

FIGS. 15A-G show a method of using nut torqueing device 100 in accordance with embodiments of the disclosure. As noted herein, each stackable element 120 has a height to easily slide with a space between end windings 10 and rotor 14. In FIG. 15A, in a first step, nut engaging element 130 is slid between end windings 10 and rotor 14 and positioned within recess 22. Each stackable element 120 (FIG. 4) may be slid into place and/or turned within recess 22 using any manner of tool, e.g., rods, planar bars, magnetic elements, grasping elements, etc. Proper positioning of each stackable element 120 can be verified using any variety of imaging device, e.g., camera, borescope, magnetic resonance imaging, etc. Once in recess 22, nut engaging element 130 may be manipulated, e.g., turned, such that projection(s) 146 (FIG. 4) thereof mate with opening(s) 142 (FIG. 4) of terminal nut 20. As shown in FIGS. 15B and 15C, any number of stackable riser elements 132A-132D necessary to fill recess 22 may be sequentially slid into place such that transmission engaging element 140 can rotationally interlock with an uppermost one thereof to transmit torque. Each stackable riser element 132 may be slid between end windings 10 and rotor 14 into recess 22, and interlocked as described herein relative to FIGS. 7A and 7B. As shown in FIG. 15D, once a sufficient number of stackable riser elements 132 (e.g., 132A-13E) are in position, transmission engaging element 140 may be slid into position to interlock with the uppermost stackable riser element, e.g., 132E. Each stackable element 120 is configured such that its respective projections mate with openings (e.g., 160) of a stackable element 120 therebelow vertically, and rotationally and vertically interlock when turned, e.g., clockwise, to exert a torque. As explained relative to FIGS. 7A and 7B, once in position, nut engaging element 130, stackable riser elements 132 and transmission engaging element 140 form nut engaging assembly 102. As explained herein, ratchet interface 106 is provided between a pair of stackable elements 120 (FIG. 4) to allow torque transmission in only one direction.

As shown in FIGS. 15D and 15E, depending on the form of transmission 106, gear box segments 240A, 240AB, 240AC are slid into position. Since transmission 106 (gear box segment(s) 240) have a low profile, they easily slide within the space between end windings 10 and rotor 14. FIG. 15D shows an embodiment in which transmission 106 includes gear box segments 240A, 240B that are hingedly connected, and FIG. 15E shows transmission 106 with gear box segments 240A, 240B, 240C that are not hingedly connected but are being placed between end windings 10 and rotor 14 sequentially and coupled. It is emphasized that either embodiment may include any number of gear box segments 240. In any event, gear box segment 240A including fan gear 212 is inserted first such that slot 216 of fan gear 212 engages lug 188 of transmission engaging element 140. Once transmission 106 is fully in place, as shown in FIG. 15G, rotational power source 108 may be mounted to rotor flange 230 using mount 232.

Figure 16:
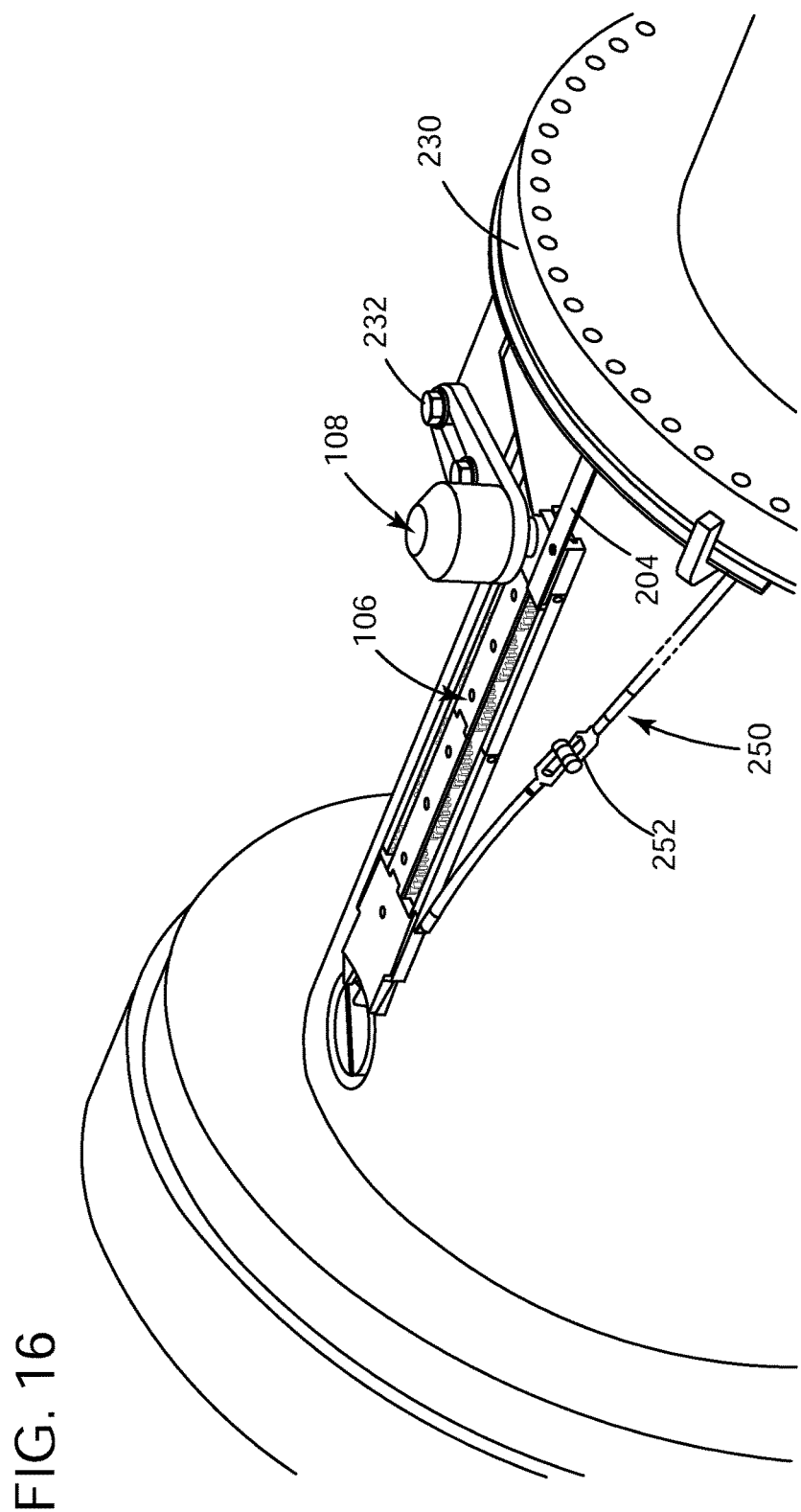
FIG. 16 shows a perspective view of a nut torqueing device on a rotor with end windings removed and including an optional strut support, according to various embodiments.

In addition, as shown in a perspective view of FIG. 16, an optional strut support 250 may be affixed to any portion of transmission 106 and to rotor flange 230 using any now known or later developed fasteners, e.g., bolts. Strut support 250 acts to circumferentially hold the position of transmission 106 (e.g., centered), where necessary. Strut support 250 may include any mechanism for adjusting its length, e.g., connectable different length sections, a turnbuckle (shown), etc.

In operation, rotational power source 108 is operated to apply a torque in a manner to tighten nut 20 through transmission 106, e.g., via coupler 204, power coupling gear 192R (FIGS. 3 and 10), meshing gears 192, fan coupling gear 192F, and fan gear 212, to nut engaging assembly 102. That is, the tightening torque applied by rotational power source 108 is transmitted through meshing gears 192 to fan gear 212, which as it turns, rotates transmission engaging element 140. As transmission engaging element 140 is turned, it applies a tightening torque to an uppermost stackable riser element 140 (e.g., 132F in FIG. 4), which in turn applies torque to each lower stackable element 120. As described relative to FIG. 7B, the torque forces each stackable element 120 to turn in such a way to rotationally (and vertically) interlock with a stackable element 120 therebelow, causing nut engaging assembly 102 to act as a substantially unitary element to apply torque to terminal nut 20. As the tightening torque is applied through nut engaging assembly 102, nut engaging element 140 tightens terminal nut 20. Once fan gear 212 reaches a maximum stroke distance (e.g., as limited by arc of arced set of gears 215 (FIG. 12) and/or transmission engaging element 140), rotational power source 108 can be reversed to move fan gear 212 in the opposite direction. As this occurs, ratchet interface 104 releases, preventing turning of nut engaging element 140 and loosening of terminal nut 20. Once fan fear 212 returns to a stroke location at which it can again apply torque to transmission engaging element 140, rotational power source 108 is reversed, which re-engages ratchet interface 106 to apply torque to tighten terminal nut 20. It is understood that once terminal nut 20 is sufficiently tightened, the parts of torque device 100 can be removed in reverse order as described relative to FIGS. 15A-G.

Nut torqueing device 100 as described herein provides a tool to tighten difficult to access nuts, such as a terminal nut 20 of an electric generator, without removing parts of the generator. Device 100 thus saves on time and costs in maintaining and/or repairing electric generators and other industrial machines in which it may find applicability. Stackable elements 120 of nut engaging assembly 102 can be sized to accommodate practically any tight fit and depth of recess.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s). As used herein, "substantially" indicates sufficient variance between stated parts so as not to depart from their intended function.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A nut torqueing device, comprising:
   a nut engaging assembly including a plurality of stackable elements, the plurality of stackable elements including:
   a nut engaging element, at least one stackable riser element configured to stackably connect to one of the nut engaging element and an adjacent stackable riser element therebelow, and a transmission engaging element configured to stackably connect to an uppermost one of the at least one stackable riser element;
   a ratchet interface between a pair of adjacent stackable elements of the nut engaging assembly allowing rotation of the nut engaging element in only one direction, wherein a rest of the plurality of stackable elements are rotationally interlocked; and
   a transmission configured to transmit rotational power from a rotational power source to the transmission engaging element of the nut engaging assembly to torque a nut engaged by the nut engaging element of the nut engaging assembly;
   wherein the at least one stackable riser element includes a plurality of the stackable riser elements, each including:
   an opening in a first side thereof, the opening including a recess extending outwardly from the opening, and
   a projection extending from a second side thereof, each projection including a ledge for engaging with a respective recess in a respective opening on the first side of an adjacent stackable riser element, and
   wherein in a first position of a first stackable riser element relative to a second, adjacent stackable riser element, the ledge engages with the recess to prevent removal of the projection from the opening and rotationally interlock the first and second stackable riser elements, and
   wherein in a second position of the first stackable riser element relative to the second, adjacent stackable riser element, the ledge disengages from the recess to allow removal of the projection from the opening.

2. The nut torqueing device of claim 1, wherein the ratchet interface is located between one of: a) the nut engaging element and a lowermost stackable riser element, b) a pair of adjacent stackable riser elements, and c) the uppermost one of the at least one stackable riser elements and the transmission engaging element.

3. The nut torqueing device of claim 1, wherein each stackable riser element and the transmission engaging element include means for selectively, rotationally interlocking to one another in a stacked fashion.

4. The nut torqueing device of claim 1, wherein each stackable riser element includes an arcuate body, and an arcuate rim extending therefrom for aligning each stackable riser element with an adjacent stackable element.

5. The nut torqueing device of claim 1, wherein the rotational power torqueing the nut engaging assembly is in a direction that forces the nut engaging assembly to the first position.

6. The nut torqueing device of claim 1, wherein the transmission includes a gear box including a plurality of meshing gears, a coupling gear operatively coupling the plurality of meshing gears to the rotational power source, and a fan gear meshing with one of the plurality of meshing gears and the transmission engaging element of the nut engaging assembly.

7. The nut torqueing device of claim 6, wherein the transmission engaging element includes an arcuate body configured to selectively, rotationally interlock with the uppermost one of the at least one stackable riser elements, and a lug extending from the arcuate body and operatively coupled to a slot in the fan gear, wherein rotation of the fan gear transmits a rotational movement to the nut engaging element through the nut engaging assembly.

8. The nut torqueing device of claim 6, wherein the gear box has a height of no greater than 2.7 centimeters, and the nut engaging assembly extends below a lower surface of the gear box.

9. The nut torqueing device of claim 1, wherein each of the nut engaging element and the at least one stackable riser element, individually, have a height of no greater than 1.25 centimeters.

10. The nut torqueing device of claim 1, wherein each of the nut engaging element and at least one stackable riser element, individually, have a width of no greater than 5 centimeters.

\* \* \* \* \*